United States Patent [19]
Hemmerich et al.

[11] 4,439,684
[45] Mar. 27, 1984

[54] ACCELERATING GRID

[75] Inventors: Johann Hemmerich; Peter Kupschus, both of Jülich; Helmut Fränkle, Unterhaching, all of Fed. Rep. of Germany

[73] Assignees: Kernforschungsanlage Jülich Gesellschaft mit Beschränkter Haftung, Jülich; Messerschmitt Belkow-Blohm Gesellschaft mit Beschränkter Haftung, Munich, both of Fed. Rep. of Germany

[21] Appl. No.: 263,929

[22] Filed: May 15, 1981

[30] Foreign Application Priority Data

May 16, 1980 [DE] Fed. Rep. of Germany ....... 3018623

[51] Int. Cl.³ .......................... H01J 3/14; H01J 7/26
[52] U.S. Cl. .................................. 250/396 R; 313/30; 313/39; 313/360.1; 313/361.1
[58] Field of Search ............ 250/503.1, 396 R; 313/407, 360.1, 361.1, 30, 32, 299, 348, 349, 404, 39; 60/202

[56] References Cited

U.S. PATENT DOCUMENTS

| | | | |
|---|---|---|---|
| 3,048,727 | 8/1962 | Krefft | 313/39 |
| 3,143,680 | 8/1964 | Klein et al. | 313/360.1 |
| 3,546,511 | 12/1970 | Shimula | 313/32 |
| 3,567,982 | 3/1971 | Droppa et al. | 313/299 |
| 3,936,691 | 2/1976 | Bakker et al. | 313/407 |
| 4,028,579 | 6/1977 | King | 313/361.1 |
| 4,164,682 | 8/1979 | Palac | 313/404 |
| 4,229,674 | 10/1980 | Hoët | 313/348 |
| 4,333,034 | 6/1982 | Ohgoshi et al. | 313/407 |

Primary Examiner—Alfred E. Smith
Assistant Examiner—Carolyn E. Fields
Attorney, Agent, or Firm—Scully, Scott, Murphy & Presser

[57] ABSTRACT

An accelerating grid particularly for an ion beam, consisting of at least one orifice plate which is fastened along an elastic outer rim thereof to a support. The orifice plate or plates includes a plurality of through-holes with mutually oriented central axes, preferably directed towards a common focusing point. A plurality of slots in the elastic outer rim maintain the alignment of the orifice plate center relative to the focus point during heat-induced expansion of the plate.

9 Claims, 2 Drawing Figures

ACCELERATING GRID

BACKGROUND OF THE INVENTION

1. Field of the Invention

The present invention relates to an accelerating grid, particularly for an ion beam, consisting of at least one orifice plate which is fastened along the outer rim thereof to a support, and which includes a plurality of through-holes with mutually oriented central axes, preferably directed towards a common focusing point.

2. Discussion of the Prior Art

Known accelerating grids of this type, such as should generally find utilization as ion beam grids in the nuclear fusion technology, and which then mostly consist of a plurality of cooled sequentially arranged orifice plates with axial alignment of their through-holes, at which there are applied different high-voltage potentials to each grid so that the ions during passing through of the grid will be concurrently highly accelerated and focused, are combined of planar orifice plates or plate segments which are rigidly clamped on a support, and during operation are subjected to a considerable thermal load and heat expansion, under the effect of which this will lead to a wide deviation of the central axes of their through-holes from the nominal focusing point and among the individual orifice plates to such extensive relative displacements, that there is exceeded the permissable tolerance range in the plate spacing and there is produced an extensive localized offset of the central axes between the through-holes of neighboring orifice plates. This produces the consequence that the ion-optical properties of the accelerating grid will be markedly disturbed.

SUMMARY OF THE INVENTION

In contrast therewith, the present invention has as its object to so construct an accelerating grid of the above-mentioned type that the disturbances which are caused through the heat expansion in the region of the orifice plate are held as small as possible, and the central axes displacement of the through-holes remain narrowly restricted with respect to the focusing point.

The foregoing object is inventively achieved by the accelerating grid of the above-mentioned type in that the orifice plate or plates include < > connecting to the outer rim fastening, <resilient edge regions> acting oppositely relative to the orifice plate center and being elastic in the direction of the surface expansion of the plate (whereby as acting oppositely resiliently there is to be understood a compensatory spring effect radially symmetrical to the center point of the grid).

Through this special type of the resilient suspension on the support, the individual orifice plates are inventively spatially stabilized in such a manner that the orifice plate center will maintain its alignment relative to the focusing point during a thermally caused surface expansion, and forms a fixed point relative to which the orifice plate will expand centrally symmetrically and extensively free of residual stresses.

This means that care must be exercised that the spring effect of the rim regions is symmetrical relative to the center point of the grid. This, in connection with the construction of the rim regions as oriented elastic, plate-inherent and uniform material spring elements affords that uncontrolled distortions or erroneous orientation of the orifice plate surface under the effect of the ion beam will be avoided, and the central axes deviation of the through-holes relative to the spatially fixed focusing point is maintained within narrow bounds.

A particularly advantageous spatial form of the orifice plate with respect to the thermal expansion consists in its partially spherical configuration with the focusing point as the center of curvature, so as to ensure that the orifice plate, under effect of heat, will expand spatially in conformance with the center of curvature, and that this will be maintained as a common point of intersection of the central axes of all through-holes.

Preferably, the orifice plate is closely bounded in the circumferential direction by the elastic plate regions so that also for a highly load and shape consistent fastening on the support continuously around the rim, there is afforded an allsided heat expansion of the orifice plate with respect to the orifice plate center as the support and spatially stable fixed point.

Due to reasons of precise orifice plate construction and anchoring on the support free of inherent stresses, in a satisfactory high-voltage configuration with smooth surfaces without expansion joints, burrs or fastener screws, it is recommended that the orifice plate be produced, with integral attachment to the support, in a galvano-plastic manner, i.e. by a cold forming process, especially when cooling passageways are provided within the orifice plate and the support is constructed as a cooling medium distributor.

In a constructionally and productionwise simple manner, the elastic plate regions preferably consist of a slot pattern being formed in the plate by mutually separated, resiliently yieldable plate connectors, or in essence, connector web segments formed in the plates intermediate the slots. A slot pattern which is particularly advantageous for this case, in which the elastic plate regions are constructed in the type of resilient zones acting in the orifice plate surface, suitably encompass at least two, preferably three mutually offset, overlapping slot rows extending in parallel with each other in the circumferential direction of the orifice plate.

Another suitable configuration for the elastic plate regions is achieved when the unapertured plate rim is bent down generally perpendicular to the surface expanse of the plate, and wherein the elastic plate region consists of <mutually separated> resiliently deflectable plate connectors < > through parallel slots extending towards the plate rim in the bent down plate rim, whereby the spring characteristics of the plate connectors can be simply varied through corresponding dimensioning of the connector widths and lengths, which should be so that a deflection parallel to the side edge can be effected due to thermal loading of the orifice plate surface without the last-mentioned being deformed. Perpendicular to the surface expanse of the orifice plate, in essence in the direction of the focusing point, there can be concurrently achieved an extremely stable support across the elastic plate regions. Hereby, for the further reduction of thermally produced residual stresses in the transitional region between the bent down plate connectors and the apertured plate portion, there can be suitably provided separating cuts adjoining the slots extending towards the plate rim, which are of particular advantage with respect to an unhindered thermal expansion of the orifice plate in the region of the temperature gradient between the ion traversed orifice plate portion and its cooler outer rim which is fastened to the support. These separating cuts reach as close as possible to the thermally subjected surface and, at the same time, are so narrow that the mechanical rigidity is not significantly influenced and there are avoided distortions over the extent of the region. Suitably these separating cuts originate from the <intermediate to apertures> regions, <> and for the cooling of the orifice plate there is provided a network of undulatory cooling passageways which alternatingly meet with the neighboring right and left passageways.

In particular for utilization in the ion beam technology, the accelerating grid preferably contains a plurality of orifice plates which are presently mutually independently connected on the support through resiliently constructed edge or rim regions and arranged behind each other in the beam direction, and which are oriented towards a common focusing point, and such a multi-cupped grid, due to the special, for all orifice plates equally resilient, also under thermal expansion highly spatially stabilized plate suspension, guarantees an extremely precise central axial alignment of the through-holes while maintaining a uniform plate spacing, so that even at intensive heating of the grid distortive deformations will be small and a ray bundle concentrated to a high measure remains afforded at the spatially constant focusing point and, in essence, preferably under concurrent beam acceleration between the spherically shaped orifice plates in a uniformly directed high-voltage field towards the central axial orientation of the through-holes.

BRIEF DESCRIPTION OF THE DRAWINGS

Reference may now be had to the following detailed description of a preferred embodiment of the invention, taken in conjunction with the accompanying drawings; in which.

DETAILED DESCRIPTION

Figure 1:
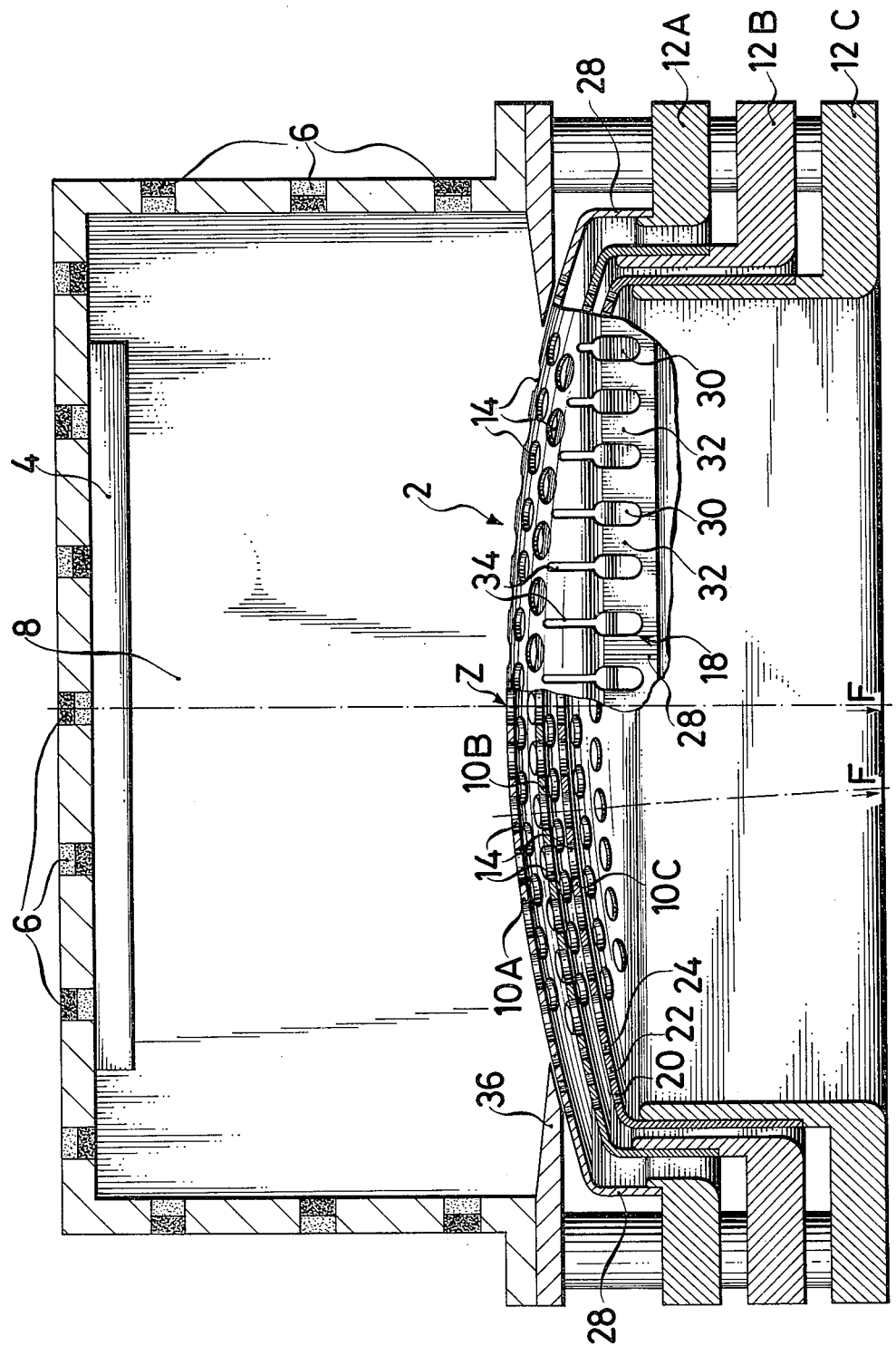
FIG. 1 illustrates a partially sectioned side elevational view of a focusing grid persuant to the invention, taken along section line I—I in FIG. 2.

The accelerating system illustrated in the figures of the drawings consists of three grids 2 with a plasma chamber 8 (equipped with a cathode head 4 and permanent magnet 6) attached thereto, and containing three partially spherical orifice plates 10A, B, C which are rectangular in plan view (FIG. 2), of uniform wall thickness in concentric arrangement with the focusing point F which is located exteriorly of FIG. 1 as the center of curvature. Each of these orifice plates is produced in a galvanoplastic manner under an integrally rigid connection with an associated similarly rectangularly-shaped support 12a, b, c, and traversed by a plurality of through-holes 14, whose central axes are in alignment with the through-holes of the adjoining orifice plates and which intersect with the focusing point F common to all orifice plates. In the unapertured portion exteriorly of the hole pattern, each orifice plate is provided with rim regions 16, 18 elastic in the direction of its surface expanse, which closely encompass the hole pattern in the circumferential direction and, at a thermal expansion of the orifice plate 10, will centrally symmetrically resiliently yield relative to the orifice plate center Z.

The elastic rim regions 16 are each formed by three, mutually parallel mutually offset slot rows 20, 22 and 24 extending relative to the narrow sides of the orifice plate 10 so that the material of the elastic rim regions 16 intermediate the staggered slot rows 20, 22, 24 which forms a plurality of connecting webs 26, is pressed together during a thermal expansion of the orifice plate 10 and thereby will take up the thermal increase in the length of the plate 10 between the respective rim region 16 and the plate center Z.

In contrast therewith, the elastic rim regions 18 are formed along the longitudinal sides of the plate, in the plate section 28 bent down cup-shaped with gentle transitional radius, at whose lower end the orifice plate 10 is fixedly connected with the associated support 12, and consists of upright plate connector web portions 32 separated from each other through parallel slots 30 extending towards the rim, which will resiliently bend outwardly during a heating of the plate 10 and, namely, at diametrically opposite locations relative to the plate center Z, equally wide and in an opposite direction.

For the relief of residual stresses along the longitudinal sides of the plate there are provided separating cuts 34 adjoining the slots 30, which extend into proximity with the hole pattern in the orifice plate surface.

The elastic rim regions 16, 18 are covered by a protective disc 36 towards the plasma chamber 8, which outwardly of the hole pattern lies on the uppermost orifice plate 10a. During operation, an electrical high-voltage field is applied between the orifice plates 10, under the effect of which the ions are accelerated and, due to the spherical configuration of the orifice plates 10, are collimated on the focusing point F. The thermal expansion of the orifice plates is taken up through the elastic rim regions 16, 18 in such a manner that the orifice plate center remains directionally stable, in effect, does not essentially sustain any sidewise displacement towards the support 12. For the cooling of the orifice plates 10 there are provided cooling medium inlet and discharge connectors 38, 40 on the support 12 to which there are connected the cooling medium passageways (not shown) traversing the orifice plate 10.

Figure 2:
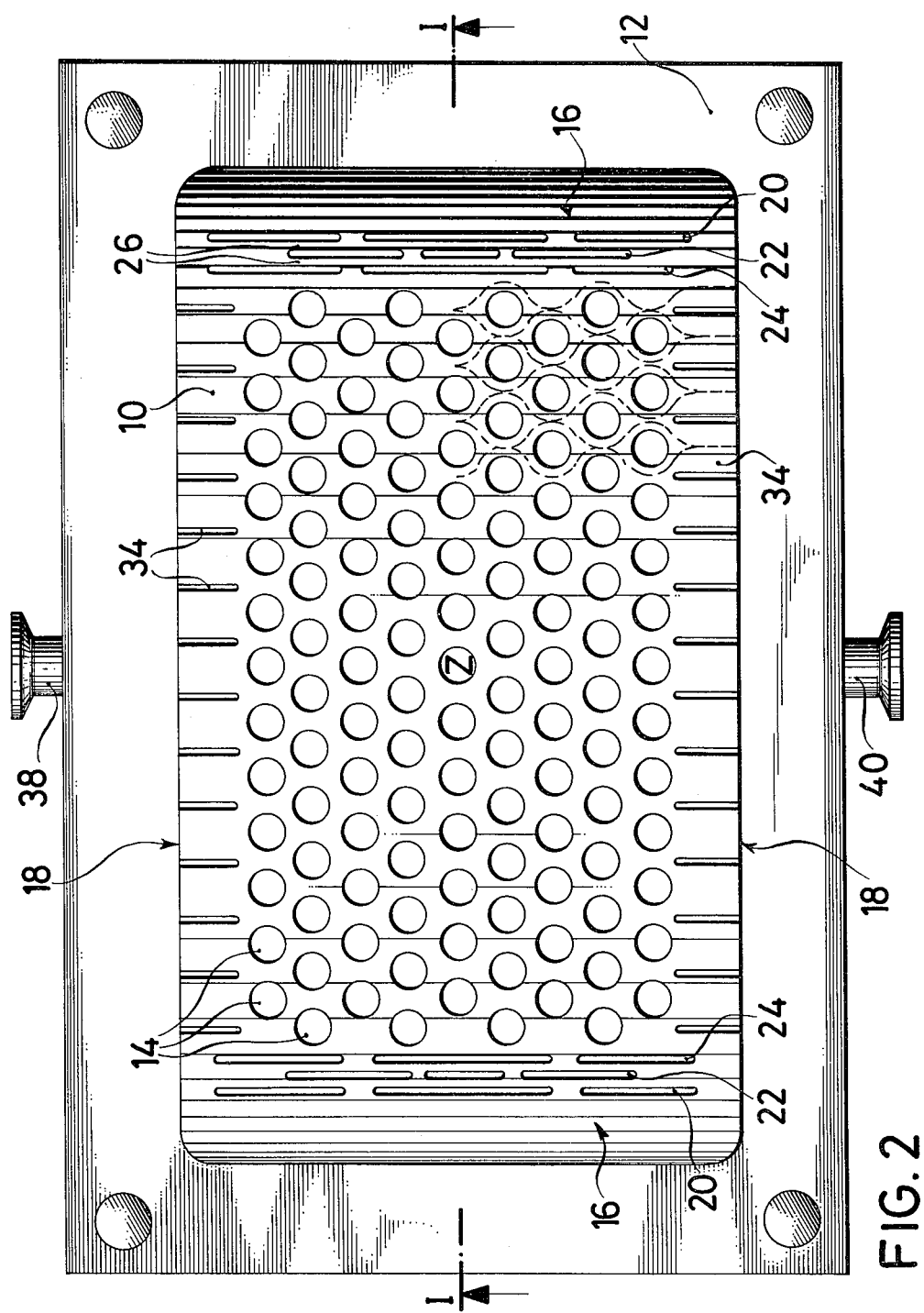
FIG. 2 illustrates a plan view of an orifice plate with an associated support.

In FIG. 2 there is shown in phantom in the right lower corner of the orifice plate a preferred cooling passageway network, and there is further illustrated that the separating lines 34 should reach as closely as possible to the thermally subjected surface.

What is claimed is:

1. An accelerating grid for focusing ion beams, said grid comprising:
   (a) at least one orifice plate, said plate having:
      (i) an ion focusing means, said means having a plurality of through-holes formed therein, each of said through-holes having an axis that converges with other through-hole axes on a common focusing point,
      (ii) resilient regions being integrally formed in said plate between said ion focusing means and the outer perimeter of said plate, at least some of said resilient regions including a plurality of parallel slots in the plate rim portion forming mutually separated, resiliently bendable plate connector webs, separating cuts in said plate extending from each of said slots into proximity with the outermost of said through-holes; and other said resilient regions including at least two mutually offset and overlapping parallel rows of slots forming plate connector webs therebetween whereby said resilient regions are elastic and deformable in the direction of the expansion of said plate when said plate is heated, (b) and support means for fixably securing the outer perimeter of the orifice plate.

2. An accelerating grid as claimed in claim 1, wherein said orifice plate is formed as a portion of a sphere, and with said common focusing point being the center point of said sphere.

3. An accelerating grid as claimed in claim 1 or 2, wherein said orifice plate is closely encompassed in a circumferential direction by said resilient plate regions.

4. An accelerating grid as claimed in claim 1, wherein said orifice plate is produced galvano-plastically and having cooling passageways formed therein, said support means also comprising a cooling medium distributor for said passageways.

5. An accelerating grid as claimed in claim 4, wherein said cooling passageways are undulating and alternatingly connecting with the adjacent left and right passageways to form a cooling passageway network in said orifice plate.

6. An accelerating grid as claimed in claim 1, wherein said resilient plate regions comprise a plurality of said slots in predetermined slot patterns, said connector webs interconnecting the region of the plate having the through-holes therein and the unapertured fixably secured outer perimeter of the orifice plate.

7. An accelerating grid as claimed in claim 1, wherein said separating cuts are arranged offset relative to the outermost of said through-holes in said orifice plate.

8. An accelerating grid as claimed in claim 1, wherein said plate connector webs are dimensioned to effect a corresponding deflection parallel to the plate side wall during a thermal expansion of the heated plate surface.

9. An accelerating system including a plurality of accelerating grids as claimed in claim 1 wherein a plurality of said orifice plates are fastened on said support means and superimposed in the beam direction, said ion focusing means being fastened independently of each other on said support means by said resiliently formed regions with said axes being oriented towards a common focusing point.

* * * * *